2 Sheets—Sheet 1.

W. P. KELLOGG & J. W. TRUSSELL.
CURRY-COMB.

No. 171,386. Patented Dec. 21, 1875.

Witnesses:
A. Ruppert,
John Eils.

W. P. Kellogg
J. W. Trussell
Inventor.
D. P. Holloway & Co.
Atty.

2 Sheets—Sheet 2.

W. P. KELLOGG & J. W. TRUSSELL.
CURRY-COMB.

No. 171,386. Patented Dec. 21, 1875.

Witnesses.
A. Ruppert,
John Eils

W. P. Kellogg
J. W. Trussell
Inventor
D. P. Holloway & Co.
Attys.

UNITED STATES PATENT OFFICE.

WILLIAM P. KELLOGG AND JOHN W. TRUSSELL, OF TROY, NEW YORK.

IMPROVEMENT IN CURRY-COMBS.

Specification forming part of Letters Patent No. 171,386, dated December 21, 1875; application filed November 16, 1875.

*To all whom it may concern:*

Be it known that we, WILLIAM P. KELLOGG and JOHN W. TRUSSELL, of Troy, in the county of Rensselaer and State of New York, have invented a new and useful Improvement in Curry-Combs, of which the following is a specification:

This invention consists in attaching to the frame of the curry-comb a handle, which extends entirely across the back, and projects far enough beyond the edge opposite to that to which it is attached by its shank to form a double handle, which may be griped immediately over the back, or on one side, as in the case of the ordinary curry-comb, the handle for this purpose being raised above the back; also, in making use of the wires which form the shank, and extend along the ends of the curry-comb, by extending them, to brace the handle in the middle; and, also, in bracing the handle and forming a thumb-piece under the middle.

We have illustrated our invention as applied to a curry-comb which, with the exception of the wooden handle, is made entirely of wrought-iron.

Figure 1:
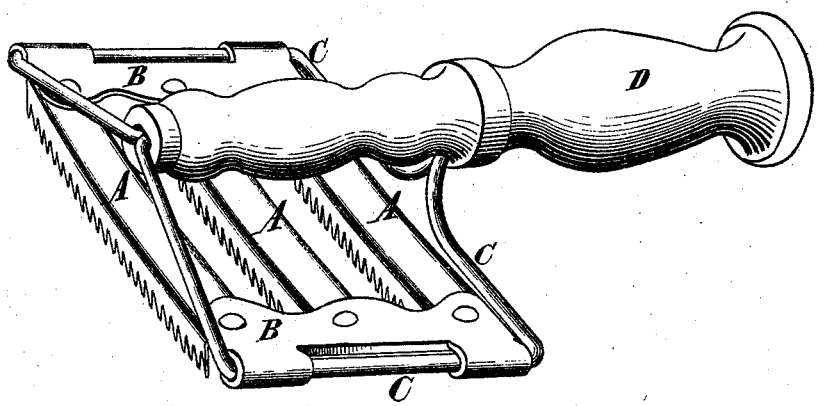
Figure 2:
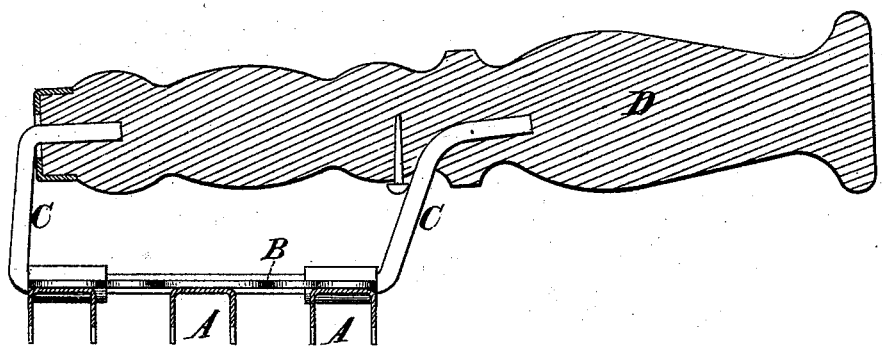

In the annexed drawings, which are made a part of this specification, Figure 1 is a perspective view, and Fig. 2 is a vertical longitudinal section.

The same letters are employed in both the figures in the indication of identical parts.

The bars A are made of strips of sheet metal, bent to form the teeth upon the edges in the well-known manner. These bars are riveted to the end pieces B, also cut out of sheet-iron, and bent to form eyes, through which are passed the wires C C. These wires are inserted into the end of the wooden handle D, and are bent up so as to raise the handle above the back far enough to permit the fingers to gripe the handle immediately above the back of the curry-comb. The wires extend through the eyes, and are bent as shown, so that their ends may be passed into a hole bored in the wooden handle near the middle, where they are secured by driving in a nail, as shown.

The extension-handle, it will be seen, forms a well-balanced and very convenient curry-comb, capable of being used with great advantage as compared with those in common use.

We do not claim, broadly, a handle formed with a bent shank to raise it above the back of the curry-comb, for such a one was shown in English Patent No. 3,956, A. D. 1815. The handle in that case was immediately over the back of the curry-comb, and, being short, afforded but one hold, whereas, in the case in hand, the extension forward of the bars gives the advantages of a double handle as well as that of a counter-balance.

Instead of forming brace in the middle of the handle by the wires which form the shank, a bent brace and shank may be formed in one piece, extending across the middle of the bars; or the wires may extend from the handles and across the end, the shank being an independent piece riveted to the bars; or the shank-wires may extend only into the eyes at the end, and the brace for the middle of the handle may be riveted to the back of the bars. In any case, however, the brace forms a thumb-piece under the handle, dividing it into two parts, and giving a grasping hold for the thumb when the curry-comb is held in the hand placed immediately over the back.

Figure 3:
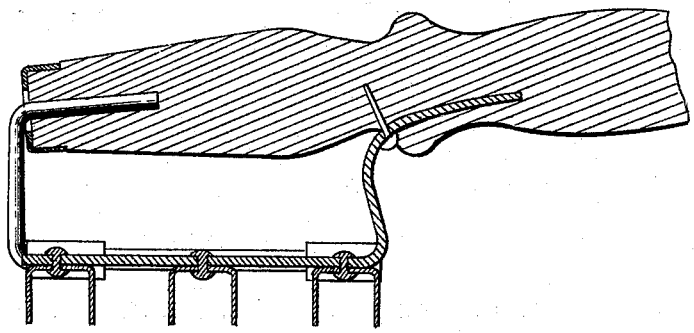
Figure 4:
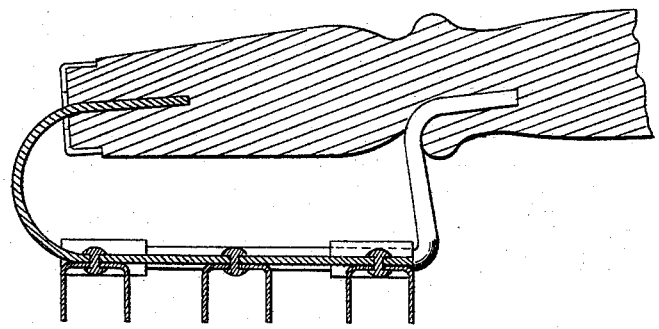
Figure 5:
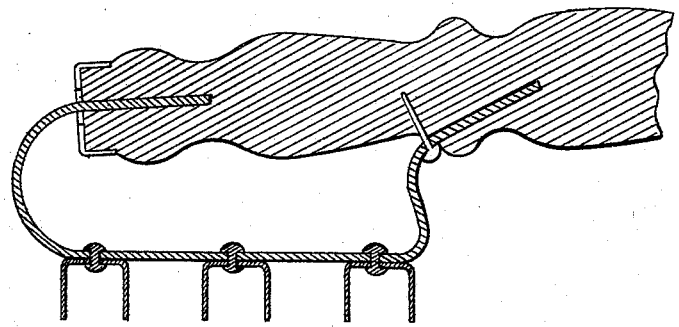

These several modes of bracing the double handle are shown in Figs. 3, 4, and 5 in the drawings, and others could readily be devised coming within the scope of our invention, which is of a straight handle placed above the back, and extending to one side and at right angles to the line of the serrated bars, and having a central support, which performs the double function of a brace and a thumb-piece, to give a better hold to the handle over the back.

What we claim as our invention, and desire to secure by Letters Patent, is—

1. A curry-comb constructed with a continuous handle, D, placed at right angles to the bars above the back, and extended beyond the bars, so as to afford a double grasp, by which it may be seized immediately above the back, and also at the side, substantially as set forth.

2. In combination with the bars, a continuous handle, D, extending entirely across the back and to one side, so as to afford a double grasp, and a brace connecting the bars with the middle of the handle, in such manner as to perform the double function of a brace and a thumb-piece under the handle, substantially as set forth.

3. In combination with the bars and the elongated handle D, affording a double grasp, the shank-wires C C, extended to form also a brace attached to the middle of the handle, substantially as set forth.

In testimony whereof we have signed our names to this specification in the presence of two subscribing witnesses.

WM. P. KELLOGG.
JOHN W. TRUSSELL.

Witnesses:
FRANK P. KELLOGG,
T. STEERS, Jr.